(12) United States Patent
Shen et al.

(10) Patent No.: US 11,708,676 B1
(45) Date of Patent: Jul. 25, 2023

(54) BOTTOM HOLE TYPE MUDSLIDE BLOCKING DAM AND DAM HEIGHT CALCULATION METHOD

(71) Applicant: Southwest Jiaotong University, Sichuan (CN)

(72) Inventors: Weigang Shen, Sichuan (CN); Xiaoyan Zhao, Sichuan (CN); Gang Luo, Sichuan (CN); YI Liu, Sichuan (CN); Feng Dai, Sichuan (CN); Ning Ma, Sichuan (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 18/175,526

(22) Filed: Feb. 27, 2023

(51) Int. Cl.
    *E02B 7/08*     (2006.01)
    *G06F 17/11*     (2006.01)
    *E02B 8/06*     (2006.01)

(52) U.S. Cl.
    CPC .................. *E02B 8/06* (2013.01); *E02B 7/08* (2013.01); *G06F 17/11* (2013.01)

(58) Field of Classification Search
    CPC ..... E02B 7/02; E02B 7/08; E02B 8/06; G06F 30/13; E01F 7/04
    See application file for complete search history.

(56) References Cited

U.S. PATENT DOCUMENTS

| | | | |
|---|---|---|---|
| 7,090,440 B1 * | 8/2006 | Short | E02D 17/207 52/156 |
| 11,414,821 B2 * | 8/2022 | Yu | E04H 17/02 |
| 2013/0022399 A1 * | 1/2013 | Pierce, Jr. | E02B 3/04 405/31 |
| 2017/0370062 A1 * | 12/2017 | Zhang | E02B 8/06 |
| 2019/0250291 A1 * | 8/2019 | Sun | G01V 1/288 |
| 2021/0026027 A1 * | 1/2021 | Zhang | G06T 17/05 |
| 2022/0334278 A1 * | 10/2022 | Zhang | G01C 13/004 |

FOREIGN PATENT DOCUMENTS

| | | | | |
|---|---|---|---|---|
| CA | 2482158 A1 * | 3/2006 | | E01F 7/04 |
| CN | 104652370 A * | 5/2015 | | |
| CN | 107423484 A * | 12/2017 | | G06F 30/13 |
| CN | 113989637 A * | 1/2022 | | |

* cited by examiner

*Primary Examiner* — Benjamin F Fiorello

(57) ABSTRACT

The present invention relates to the technical field of mudslide prevention and control engineering, and provides a bottom hole type mudslide blocking dam and a dam height calculation method. According to the present invention, a climbing height of the mudslide impacting a bottom hole type mudslide blocking dam can be accurately calculated, so as to guide the height design of a dam body of the bottom hole type mudslide blocking dam, thereby guaranteeing the working safety and the protection capacity of the bottom hole type mudslide blocking dam, and saving the manufacturing cost of the bottom hole type mudslide blocking dam.

8 Claims, 4 Drawing Sheets

Acquire an average flow depth $v_0$ and an average flow velocity $h_0$ of the mudslide at a target position, wherein the target position is a position where a bottom hole type mudslide blocking dam is to be built — S101

Calculate Fr according to $F_r = v_0/\sqrt{gh_0}$, wherein Fr is a dimensionless Froude number, g is the gravitational acceleration, and g=9.8m/s² — S102

Calculate B according to $B = H_c/h_0$, wherein B is a relative clearance height, and $H_c$ is a base clearance height of the bottom hole type mudslide blocking dam — S103

Establish an equation $\left(\frac{h_1}{h_0}\right)^3 - \left(\frac{h_1}{h_0}\right)^2 - (2F_r^2+1)\left(\frac{h_1}{h_0}\right) + 1 + 2F_r^2\left(2B^{2.5} - B^5 - B^4 + B^4(\frac{h_1}{h_0})\right) = 0$ and calculate $h_1$, $h_1$ being a climbing height of the mudslide, and determine the dam height of the bottom hole type mudslide blocking dam according to $h_1$ — S104

FIG. 1

Establish $\rho h_0(v_0+s) = \rho(h_1-H_c)s + \rho H_c(v_1+s)$ according to a mass conservation law, and solve s to obtain $s = \dfrac{H_c v_1 - h_0 v_0}{h_0 - h_1}$ — S1041

Establish an integral equation $\rho h_0(v_0+s)v_0 + \int_0^{h_0}\sigma_{0xx}dz = \rho H_c(v_1+s)v_1 + \int_0^{h_1}\sigma_{1xx}dz$ according to a momentum conservation law, wherein $\sigma_{0xx} = \rho g(h_0 - z)$, $\sigma_{1xx} = \rho g(h_1 - z)$ — S1042

Substitute the equations of $\sigma_{0xx}$ and $\sigma_{1xx}$ into the integral equation to obtain $h_0(v_0+s)v_0 - H_c(v_1+s)v_1 - \dfrac{1}{2}g(h_1^2 - h_0^2) = 0$, so as to solve $h_1$ — S1043

FIG. 2

Establish a relational expression $v_1 = v_0 B^{1.5}$ between $v_1$ and $v_0$ — S1044

Substitute $s = \dfrac{H_c v_1 - h_0 v_0}{h_0 - h_1}$ and the relational expression $v_1 = v_0 B^{1.5}$ into $h_0(v_0+s)v_0 - H_c(v_1+s)v_1 - \dfrac{1}{2}g(h_1^2 - h_0^2) = 0$ to obtain an equation $\left(\dfrac{h_1}{h_0}\right)^3 - \left(\dfrac{h_1}{h_0}\right)^2 - (2F_r^2+1)\left(\dfrac{h_1}{h_0}\right) + 1 + 2F_r^2\left(2B^{2.5} - B^5 - B^4 + B^4(\dfrac{h_1}{h_0})\right) = 0$, and solve $h_1$ — S1045

FIG. 3

BOTTOM HOLE TYPE MUDSLIDE BLOCKING DAM AND DAM HEIGHT CALCULATION METHOD

TECHNICAL FIELD

The present invention relates to the technical field of mudslide prevention and control engineering, in particular to a bottom hole type mudslide blocking dam and a dam height calculation method.

BACKGROUND

Mudslide refer to a special flood current of landslide caused by heavy rain, snowstorm or other natural disasters and carrying a large amount of sediment and stones in mountainous or other areas with deep ravines and steep terrain. Mudslide has the characteristics such as suddenness, as well as fast flow, high flow rate, large material capacity and strong destructive force. Mudslide is one of the three major geological disasters in mountainous areas of our country. Every year in our country, a large number of casualties and property losses are caused by mudslide disasters, posing a serious threat to the safety of people's lives and properties. A sediment storage dam is one of the main engineering measures for preventing and controlling mudslide. The sediment storage dam is usually pre-built in a channel prone to mudslide, and is used for blocking and consuming the energy of the mudslide when a disaster strikes, so as to achieve the effect of intercepting the mudslide. This requires the sediment storage dam to have sufficient strength to absorb and consume the energy brought by the mudslide, and to also have a sufficient height at the same time to avoid the mudslide from climbing over.

Since being easily silted up by mudslide materials, a full-section non-permeable sediment storage dam loses its blocking capacity prematurely after the mudslide disaster occurs. Therefore, a bottom hole type mudslide blocking dam is the development trend of mudslide prevention and control engineering. Providing a clearance between the bottom of the sediment storage dam and the channel to allow the mudslide to partially pass through is a common measure for the bottom hole type mudslide blocking dam. Such clearance needs to ensure a certain proportional size, so as to ensure that the sediment storage dam can also effectively consume the energy of the mudslide while allowing some mudslide materials to pass through. Moreover, the bottom hole type mudslide blocking dam also needs to be arranged at a suitable height to prevent the mudslide from climbing too high and climbing over the sediment storage dam on the premise of avoiding high cost. At present, there is no effective method in the art that can more accurately calculate the climbing height of the mudslide on the sediment storage dam when the mudslide encounters the bottom hole type mudslide blocking dam with the bottom allowing part of the mudslide to pass through.

SUMMARY

The present invention aims to provide a bottom hole type mudslide blocking dam and a dam height calculation method. According to the present invention, a climbing height of the mudslide impacting a bottom hole type mudslide blocking dam can be accurately calculated, so as to guide the height design of a dam body of the bottom hole type mudslide blocking dam, thereby guaranteeing the working safety and the protection capacity of the bottom hole type mudslide blocking dam, and saving the manufacturing cost of the bottom hole type mudslide blocking dam.

Embodiments of the present invention are achieved in this way:

In one aspect of the embodiments of the present invention, a method for calculating a dam height of a bottom hole type mudslide blocking dam is provided, including: acquiring an average flow depth $v_0$ and an average flow velocity $h_0$ of the mudslide at a target position, where the target position is a position where a bottom hole type mudslide blocking dam is to be built; calculating Fr according to $F_r = v_0/\sqrt{gh_0}$, where Fr is a dimensionless Froude number, g is the gravitational acceleration, and $g=9.8$ m/s$^2$; calculating B according to $B=H_c/h_0$, where B is a relative clearance height, and $H_c$ is a base clearance height of the bottom hole type mudslide blocking dam; and establishing an equation $$\left(\frac{h_1}{h_0}\right)^3 - \left(\frac{h_1}{h_0}\right)^2 - (2F_r^2 + 1)\left(\frac{h_1}{h_0}\right) + 1 + 2F_r^2\left(2B^{2.5} - B^5 - B^4 + B^4\left(\frac{h_1}{h_0}\right)\right) = 0$$

and calculating $h_1$, $h_1$ being a climbing height of the mudslide, and determining the dam height of the bottom hole type mudslide blocking dam according to $h_1$.

Optionally, establishing an equation $$\left(\frac{h_1}{h_0}\right)^3 - \left(\frac{h_1}{h_0}\right)^2 - (2F_r^2 + 1)\left(\frac{h_1}{h_0}\right) + 1 + 2F_r^2\left(2B^{2.5} - B^5 - B^4 + B^4\left(\frac{h_1}{h_0}\right)\right) = 0$$

and calculating $h_1$ includes:

establishing $\rho h_0(v_0+s) = \rho(h_1-H_c)s + \rho H_c(v_1+s)$ according to a mass conservation law, and solving s to obtain $$s = \frac{H_c v_1 - h_0 v_0}{h_0 - h_1},$$

where $\rho$ is the density of the mudslide, s is the shock wave velocity, and $v_1$ is the velocity of the mudslide flowing out of the base clearance of the bottom hole type mudslide blocking dam; establishing an integral equation $$\rho h_0(v_0+s)v_0 \int_0^{h_0} \sigma_{0xx} dz = \rho H_c(v_1+s)v_1 + \int_0^{h_1} \sigma_{1xx} dz$$

according to a momentum conservation law, where $\sigma_{0xx}$ and $\sigma_{1xx}$ are the pressure on the mudslide section, $\sigma_{0xx}=\rho g(h_0-z)$, $\sigma_{1xx}=\rho g(h_1-z)$, and z is the ordinate of integration points; and substituting the equations of $\sigma_{0xx}$ and $\sigma_{1xx}$ into the integral equation to obtain $$h_0(v_0+s)v_0 - H_c(v_1+s)v_1 - \frac{1}{2}g(h_1^2 - h_0^2) = 0,$$

so as to solve $h_1$.

Optionally, substituting the equations of $\sigma_{0xx}$ and $\sigma_{1xx}$ into the integral equation to obtain $$h_0(v_0+s)v_0 - H_c(v_1+s)v_1 - \frac{1}{2}g(h_1^2 - h_0^2) = 0,$$

so as to solve $h_1$ includes: establishing a relational expression $v_1 = v_0 B^{1.5}$ between $v_1$ and $v_0$; substituting $$s = \frac{H_c v_1 - h_0 v_0}{h_0 - h_1}$$

and the relational expression $v_1 = v_0 B^{1.5}$ into $$h_0(v_0+s)v_0 - H_c(v_1+s)v_1 - \frac{1}{2}g(h_1^2 - h_0^2) = 0$$

to obtain an equation $$\left(\frac{h_1}{h_0}\right)^3 - \left(\frac{h_1}{h_0}\right)^2 - (2F_r^2 + 1)\left(\frac{h_1}{h_0}\right) + 1 + 2F_r^2\left(2B^{2.5} - B^5 - B^4 + B^4\left(\frac{h_1}{h_0}\right)\right) = 0;$$

and solving $h_1$.

In another aspect of the embodiments of the present invention, a bottom hole type mudslide blocking dam is provided, where the bottom hole type mudslide blocking dam is calculated by the method for calculating a dam height of a bottom hole type mudslide blocking dam according to any preceding claim, and the height of the dam body of the bottom hole type mudslide blocking dam is set.

Optionally, the bottom hole type mudslide blocking dam according to the embodiments of the present invention includes a dam body provided in connection with a channel at a target position of the channel, where a base clearance is formed at the bottom of the dam body by upward processing, and the base clearance is used to allow part of the mudslide flowing through the section of the dam body in the channel to pass through.

Optionally, the dam body includes a main dam and abutments connected to opposite sides of the main dam, the abutments being connected to both side walls of the channel.

Optionally, the base clearance is located at the bottom of the main dam.

Optionally, the height of the dam body is greater than the climbing height of the mudslide.

The embodiments of the present invention have the beneficial effects that: the embodiments of the present invention provide a method for calculating a dam height of a bottom hole type mudslide blocking dam, including: acquiring an average flow depth $v_0$ and an average flow velocity $h_0$ of the mudslide at a target position, where the target position is a position where a bottom hole type mudslide blocking dam is to be built; calculating Fr according to $F_r = v_0/\sqrt{gh_0}$, where Fr is a dimensionless Froude number, g is the gravitational acceleration, and g=9.8 m/s²; calculating B according to $B = H_c/h_0$, where B is a relative clearance height, and $H_c$ is a base clearance height of the bottom hole type mudslide blocking dam; and establishing $$\left(\frac{h_1}{h_0}\right)^3 - \left(\frac{h_1}{h_0}\right)^2 - (2F_r^2 + 1)\left(\frac{h_1}{h_0}\right) + 1 + 2F_r^2\left(2B^{2.5} - B^5 - B^4 + B^4\left(\frac{h_1}{h_0}\right)\right) = 0$$

an equation and calculating $h_1$, $h_1$ being a climbing height of the mudslide, and determining the dam height of the bottom hole type mudslide blocking dam according to $h_1$. By using the method for calculating a dam height of a bottom hole type mudslide blocking dam provided in the embodiments of the present invention, the climbing height of the mudslide is first calculated, and the climbing height of the mudslide impacting the bottom hole type mudslide blocking dam can be obtained by means of derivation, simulation and calculation of various equations in the embodiments of the present invention by only acquiring the average flow depth $v_0$ and the average flow velocity $h_0$ of the mudslide at the target position, as well as the preset base clearance height $H_c$ of the bottom hole type mudslide blocking dam, so as to provide theoretical basis and data support for the dam type design of the bottom hole type mudslide blocking dam provided with a base clearance, especially the setting of the height of the dam body. Thus, the bottom hole type mudslide blocking dam whose height of the dam body is determined by the climbing height of the mudslide calculated according to the embodiments of the present invention can ensure the effectiveness of intercepting the mudslide, and prevent the mudslide from impacting too much, resulting in climbing over the sediment storage dam, thereby improving the prevention and control effect of the mudslide disaster.

BRIEF DESCRIPTION OF THE DRAWINGS

In order to illustrate the technical solutions of the embodiments of the present invention more clearly, the accompanying drawings required in the embodiments will be briefly introduced below. It should be understood that the following accompanying drawings only show some embodiments of the present invention, and thus should not be regarded as a limitation on the scope. Those of ordinary skill in the art can also obtain other related accompanying drawings based on these accompanying drawings without creative work.

FIG. 1 is a first flowchart of a method for calculating a dam height of a bottom hole type mudslide blocking dam provided by the embodiments of the present invention;

FIG. 2 is a second flowchart of a method for calculating a dam height of a bottom hole type mudslide blocking dam provided by the embodiments of the present invention;

FIG. 3 is a third flowchart of a method for calculating a dam height of a bottom hole type mudslide blocking dam provided by the embodiments of the present invention;

DETAILED DESCRIPTION

Figure 4:
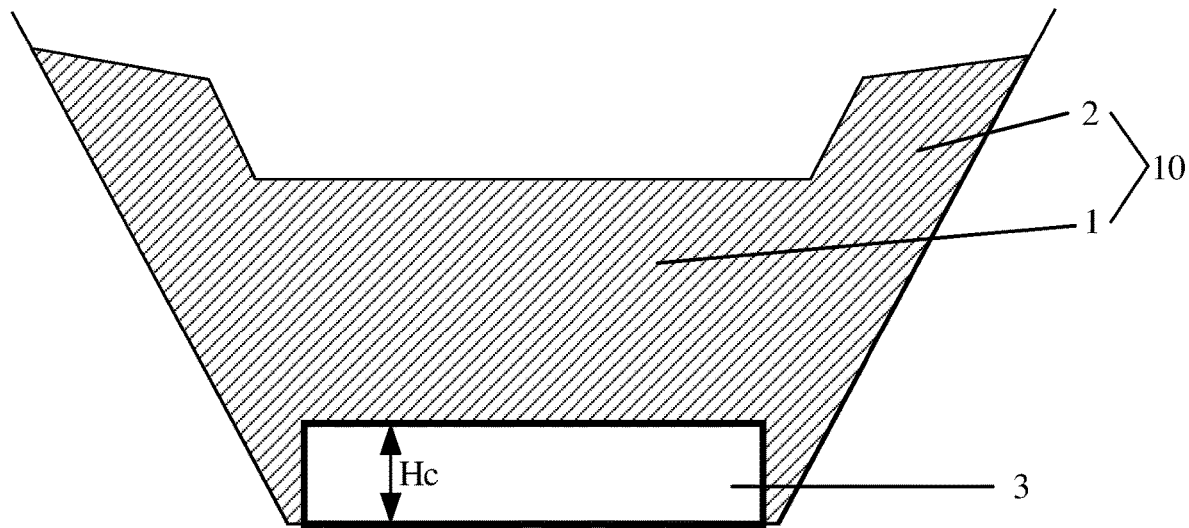
FIG. 4 is a schematic structural diagram of a bottom hole type mudslide blocking dam provided by the embodiments of the present invention.

In order to make the purpose, technical solutions and advantages of the embodiments of the present invention clearer, the technical solutions in the embodiments of the present invention will be clearly and completely described below in conjunction with the accompanying drawings in the embodiments of the present invention. Obviously, the described embodiments are part but not all embodiments of the present invention. The components of the embodiments of the present invention generally described and illustrated in the accompanying drawings herein may be arranged and designed in a variety of different configurations. Accordingly, the following detailed description of the embodiments of the invention provided in the accompanying drawings is not intended to limit the scope of the claimed invention, but merely represents selected embodiments of the present invention. Based on the embodiments of the present invention, all the other embodiments obtained by those of ordinary skill in the art without creative efforts fall within the scope of protection of the present invention.

It should be noted that like numerals and letters denote similar items in the following accompanying drawings. Therefore, once an item is defined in one accompanying drawing, further definition and explanation are not required in subsequent accompanying drawings.

In the description of the present invention, the orientation or positional relationship indicated by the terms "center", "vertical", "horizontal", etc. is based on the orientation or positional relationship shown in the accompanying drawings, or the conventionally placed orientation or positional relationship when the product of the present invention is used, which is only for the convenience of describing the present invention and simplifying the description, does not indicate or imply that the referred device or element must have a specific orientation and be constructed and operated in a specific orientation, and thus should not be construed as a limitation of the present invention. In addition, the terms "first", "second", etc. are only used for distinguishing descriptions, and should not be construed as indicating or implying relative importance.

A sediment storage dam is built in the channel to block and intercept the mudslide during the mudslide disaster, so as to prevent the impact energy of the mudslide from causing the loss in people's lives and properties. A clearance is arranged between the dam bottom of the bottom hole type mudslide blocking dam and the channel. The arrangement of the clearance allows part of the mudslide to pass through. In this way, a small part of impact force is released while most of the impact energy of the mudslide is intercepted, thereby reducing the impact on the bottom hole type mudslide blocking dam when intercepting the mudslide, preventing the mudslide from washing away the bottom hole type mudslide blocking dam, and also preventing the bottom hole type mudslide blocking dam from being quickly silted up, resulting in losing the capacity of blocking and interception.

As a defensive prevention and control fortification, the bottom hole type mudslide blocking dam needs to be pre-built before a disaster strikes. Therefore, the dam height of the bottom hole type mudslide blocking dam becomes an important setting parameter. If the dam is built too high, a lot of cost and labor will be inevitably wasted; while if the dam is built not high enough, if the mudslide climbs higher than the dam body when a mudslide disaster strikes, the mudslide will directly climb over the bottom hole type mudslide blocking dam, or even wash away the bottom hole type mudslide blocking dam. At present, there is no convenient and effective method that can more accurately obtain, by means of simulation calculation, the climbing height of the mudslide on the bottom hole type mudslide blocking dam when the mudslide encounters the bottom hole type mudslide blocking dam with the bottom allowing part of the mudslide to pass through.

The embodiments of the present invention provide a method for calculating a dam height of a bottom hole type mudslide blocking dam. As shown in FIG. 1, the dam height calculation method includes:

S101, acquire an average flow depth $v_0$ and an average flow velocity $h_0$ of the mudslide at a target position, where the target position is a position where a bottom hole type mudslide blocking dam is to be built.

A bottom hole type mudslide blocking dam is built in the channel of a target position or similar areas to intercept the mudslide that will flow through the section of the bottom hole type mudslide blocking dam during the mudslide disaster. The average flow depth $v_0$ and the average flow velocity $h_0$ of the mudslide at the target position are first acquired. At this time, the average flow depth $v_0$ and the average flow velocity $h_0$ of the mudslide are usually values preset by those skilled in the art. The preset values can be related actual recorded data or statistical data obtained by those skilled in the art according to the mudslide disaster situation in the past period of time at the target position, or can be simulated data obtained in the form of numerical simulation, analogue simulation, etc., or relevant data obtained in other ways. In the embodiments of the present invention, the source of the data regarding the average flow depth $v_0$ and the average flow velocity $h_0$ is not specifically limited, as long as it is obtained by those skilled in the art by using the above-mentioned various methods, and can reflect the expected flow depth and flow velocity of the mudslide at the position during the mudslide disaster. The unit of the average flow depth $v_0$ of the mudslide is m/s, and the unit of the average flow velocity $h_0$ of the mudslide is in.

S102, calculate Fr according to equation (1), $$F_r = v_0/\sqrt{gh_0} \tag{1}$$

where Fr is a dimensionless Froude number, g is the gravitational acceleration, and g=9.8 m/s².

After the values of the average flow depth $v_0$ and the average flow velocity $h_0$ are acquired, the value of the dimensionless Froude number Fr can be calculated according to the above equation (1) by calculating the average flow depth $v_0$ and the average flow velocity $h_0$.

S103, calculate B according to equation (2), $$B = H_c/h_0 \tag{2}$$

where B is a relative clearance height, and $H_c$ is a base clearance height of the bottom hole type mudslide blocking dam, measured in meters.

The relative clearance height B is then calculated according to the above equation (2) by means of the base clearance height $H_c$ of the bottom hole type mudslide blocking dam, combining the average flow velocity $h_0$ of the mudslide, and the relative clearance height B is also measured in meters.

It should be noted that for the bottom hole type mudslide blocking dam, the setting parameters of the base clearance are also very important design links, including the number, position, shape and size of the base clearance (including the height $H_c$ of the base clearance). Scientific base clearance design usually needs to comprehensively consider many qualitative or quantitative factors such as the purpose of prevention and control, the characteristics of a dam body opening, the properties of the mudslide and the movement characteristics of the mudslide. The base clearance can only be arranged especially based on solid experimental test data and field survey data, and has a comprehensive set of design ideas and design methods of its own. Since the embodiments of the present invention do not demonstrate and design the base clearance, further description in detail will not provided. According to the embodiments of the present invention, the climbing height of the mudslide is calculated based on the design and determination of the height $H_c$ of the base clearance of the bottom hole type mudslide blocking dam, so as to obtain a relatively accurate climbing height of the mudslide by means of calculation, which supports the determination of the height of the dam body of the bottom hole type mudslide blocking dam.

S104, establish an equation (3) and calculate $h_1$, $$\left(\frac{h_1}{h_0}\right)^3 - \left(\frac{h_1}{h_0}\right)^2 - (2F_r^2 + 1)\left(\frac{h_1}{h_0}\right) + \\ 1 + 2F_r^2\left(2B^{2.5} - B^5 - B^4 + B^4\left(\frac{h_1}{h_0}\right)\right) = 0 \quad (3)$$

$h_1$ being a climbing height of the mudslide, and determine the dam height of the bottom hole type mudslide blocking dam according to $h_1$.

Equation (3) is then established, and the climbing height $h_1$ of the mudslide is calculated by solving the unary cubic equation of the equation (3).

For the calculation of equation (3) and the solution to the climbing height $h_1$ of the mudslide, Matlab or other simulation calculations can be used to solve the solution. In the embodiments of the present invention, there is no specific limitation on the solution calculation method of the unary cubic equation, as long as it is able to solve and calculate the climbing height $h_1$ of the mudslide. After accurate climbing height $h_1$ of the mudslide is calculated, the dam height of the bottom hole type mudslide blocking dam can be determined correspondingly. For example, the dam height of the bottom hole type mudslide blocking dam can be determined by adding 1 m to the calculated climbing height $h_1$ of the mudslide.

A method for calculating a dam height of a bottom hole type mudslide blocking dam provided by the embodiments of the present invention includes: acquiring an average flow depth $v_0$ and an average flow velocity $h_0$ of the mudslide at a target position, where the target position is a position where a bottom hole type mudslide blocking dam is to be built; calculating Fr according to $F_r = v_0/\sqrt{gh_0}$, where Fr is a dimensionless Froude number, g is the gravitational acceleration constant, and g=9.8 m/s²; calculating B according to $B = H_c/h_0$, where B is a relative clearance height, and $H_c$ is a base clearance height of the bottom hole type mudslide blocking dam; and establishing an equation $$\left(\frac{h_1}{h_0}\right)^3 - \left(\frac{h_1}{h_0}\right)^2 - (2F_r^2 + 1)\left(\frac{h_1}{h_0}\right) + 1 + 2F_r^2\left(2B^{2.5} - B^5 - B^4 + B^4\left(\frac{h_1}{h_0}\right)\right) = 0$$

and calculating $h_1$, $h_1$ being a climbing height of the mudslide, and determining the dam height of the bottom hole type mudslide blocking dam according to $h_1$. By using the method for calculating a dam height of a bottom hole type mudslide blocking dam provided in the embodiments of the present invention, the climbing height of the mudslide is calculated by only acquiring the average flow depth $v_0$ and the average flow velocity $h_0$ of the mudslide at the target position, as well as the preset base clearance height $H_c$ of the bottom hole type mudslide blocking dam, so that the climbing height of the mudslide impacting the bottom hole type mudslide blocking dam can be obtained by means of derivation, simulation and calculation of various equations in the embodiments of the present invention, so as to provide theoretical basis and data support for the dam type design of the bottom hole type mudslide blocking dam provided with a base clearance, especially the setting of the height of the dam body. Thus, the bottom hole type mudslide blocking dam with a climbing height design of the mudslide calculated according to the embodiments of the present invention can ensure the effectiveness of intercepting the mudslide, and prevent the mudslide from impacting too much, resulting in climbing over the bottom hole type mudslide blocking dam, thereby improving the prevention and control effect of the mudslide disaster.

Optionally, as shown in FIG. 2, step S104 includes:

S1041, establish an equation (4) according to a mass conservation law:

$$\rho h_0(v_0+s) = \rho(h_1-H_c)s + \rho H_c(v_1+s) \quad (4)$$

and solving s to obtain an equation (5):

$$s = \frac{H_c v_1 - h_0 v_0}{h_0 - h_1} \quad (5)$$

where ρ is the density of the mudslide with the unit being kg/m3, s is the shock wave velocity with the unit being m/s, and $v_1$ is the velocity of the mudslide flowing out of the base clearance of the bottom hole type mudslide blocking dam, with the unit being m/s.

S1042, establish an integral equation (6) according to a momentum conservation law:

$$\rho h_0(v_0 + s)v_0 + \int_0^{h_0} \sigma_{0xx} dz = \rho H_c(v_1 + s)v_1 + \int_0^{h_1} \sigma_{1xx} dz \quad (6)$$

where $\sigma_{0xx}$ and $\sigma_{1xx}$ are the pressure on the mudslide section, with the unit being Pa, $\sigma_{0xx} = \rho g(h_0-z)$, $\sigma_{1xx} = \rho g(h_1-z)$, and z is the ordinate of integration points with the unit being in.

S1043, respectively substitute the equations of $\sigma_{0xx}$ and $\sigma_{1xx}$ into the integral equation to obtain an equation (7):

$$h_0(v_0 + s)v_0 - H_c(v_1 + s)v_1 - \frac{1}{2}g(h_1^2 - h_0^2) = 0 \quad (7)$$

so as to solve $h_1$ according to the above equation (7).

Optionally, as shown in FIG. 3, step S1043 also includes:
S1044, establish a relational expression (8) between $v_1$ and $v_0$:

$$v_1 = v_0 B^{1.5} \quad (8).$$

The establishment of the relational expression (8) also includes substituting the calculation equation (2) for the relative clearance height B.

S1045, substitute the equation (5):

$$s = \frac{H_c v_1 - h_0 v_0}{h_0 - h_1}$$

and the relational expression (8): $v_1=v_0B^{1.5}$ into the equation (7):

$$h_0(v_0+s)v_0 - H_c(v_1+s)v_1 - \frac{1}{2}g(h_1^2 - h_0^2) = 0$$

to obtain an equation (3):

$$\left(\frac{h_1}{h_0}\right)^3 - \left(\frac{h_1}{h_0}\right)^2 - (2F_r^2+1)\left(\frac{h_1}{h_0}\right) + 1 + 2F_r^2\left(2B^{2.5} - B^5 - B^4 + B^4\left(\frac{h_1}{h_0}\right)\right) = 0;$$

and solve $h_1$ by solving the equation (3).

In summary, in the method for calculating a dam height of a bottom hole type mudslide blocking dam provided in the embodiments of the present invention, since the climbing height of the mudslide impacting the bottom hole type mudslide blocking dam can be obtained by means of derivation, simulation and calculation of various equations in the embodiments of the present invention by only acquiring the average flow depth $v_0$ and the average flow velocity $h_0$ of the mudslide at the target position, as well as the preset base clearance height $H_c$ of the bottom hole type mudslide blocking dam, the simulated values of the mudslide climbing height when the bottom hole type mudslide blocking dam provided with different base clearance heights $H_c$ faces the impact of mudslide can be calculated, so as to provide a theoretical reference with higher accuracy for the evaluation, design and determination of the height of the dam body of the bottom hole type mudslide blocking dam provided with different base clearance heights $H_c$. Thus, on the basis of ensuring the intercepting effectiveness of the bottom hole type mudslide blocking dam, preventing the mudslide from impacting too much which results in climbing over the bottom hole type mudslide blocking dam, and improving the prevention and control effect of the mudslide disaster, the bottom hole type mudslide blocking dam whose dam height is determined by the climbing height of the mudslide calculated according to the embodiments of the present invention can save the engineering materials for the building of the bottom hole type mudslide blocking dam, and reduce the engineering cost of the bottom hole type mudslide blocking dam.

Figure 5:
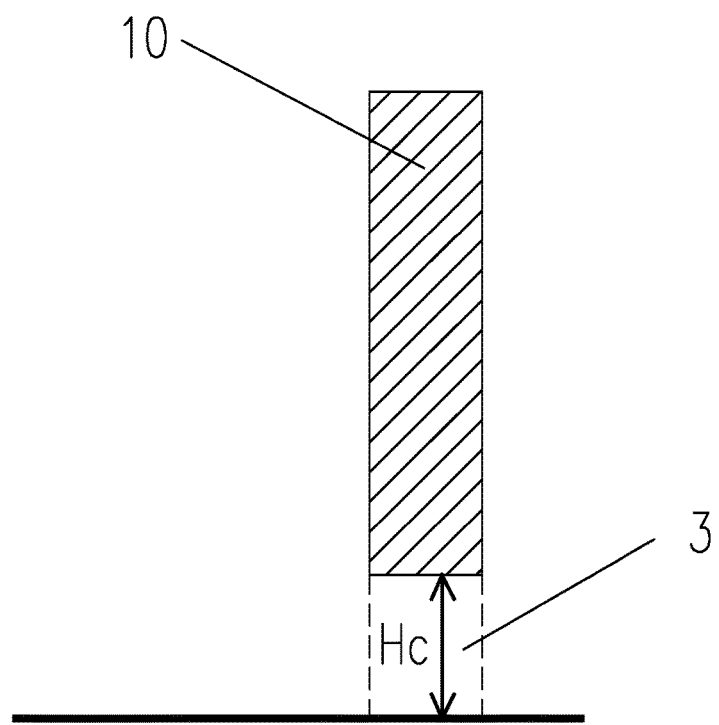
FIG. 5 is a side view of FIG. 4.

In another aspect of the embodiments of the present invention, a bottom hole type mudslide blocking dam is provided. What is shown in FIG. 4 combined with FIG. 5 is a schematic structural diagram of the bottom hole type mudslide blocking dam according to the embodiments of the present invention. The height of the dam body of the bottom hole type mudslide blocking dam according to the embodiments of the present invention is calculated by the method for calculating a dam height of a bottom hole type mudslide blocking dam according to any preceding claim, and the height of the dam body 10 of the bottom hole type mudslide blocking dam is set.

The bottom hole type mudslide blocking dam is used to intercept the mudslide frontally during the mudslide disaster, and allows part of the mudslide to pass through by means of the base clearance 3 arranged on the bottom hole type mudslide blocking dam, which, on the basis of blocking most of the impact force of the mudslide, reduces the impact of the entire bottom hole type mudslide blocking dam from the mudslide to a certain extent, improves the interception capacity of the bottom hole type mudslide blocking dam, and at the same time prevents from completely blocking the mudslide to lost the ability of mudslide interception after the mudslide quickly accumulates in large quantities on one side of the bottom hole type mudslide blocking dam, thereby improving the effective interception time of the bottom hole type mudslide blocking dam. This requires setting the height of the dam body of the bottom hole type mudslide blocking dam to an appropriate value on the basis of the relatively accurate climbing height calculated of the mudslide $h_1$, so as to ensure that the bottom hole type mudslide blocking dam can withstand the frontal impact of the mudslide, and prevent the climbing height $h_1$ of the mudslide from being too high, which results in the mudslide climbing over the sediment storage dam from the top of the dam body 10.

Figure 6:
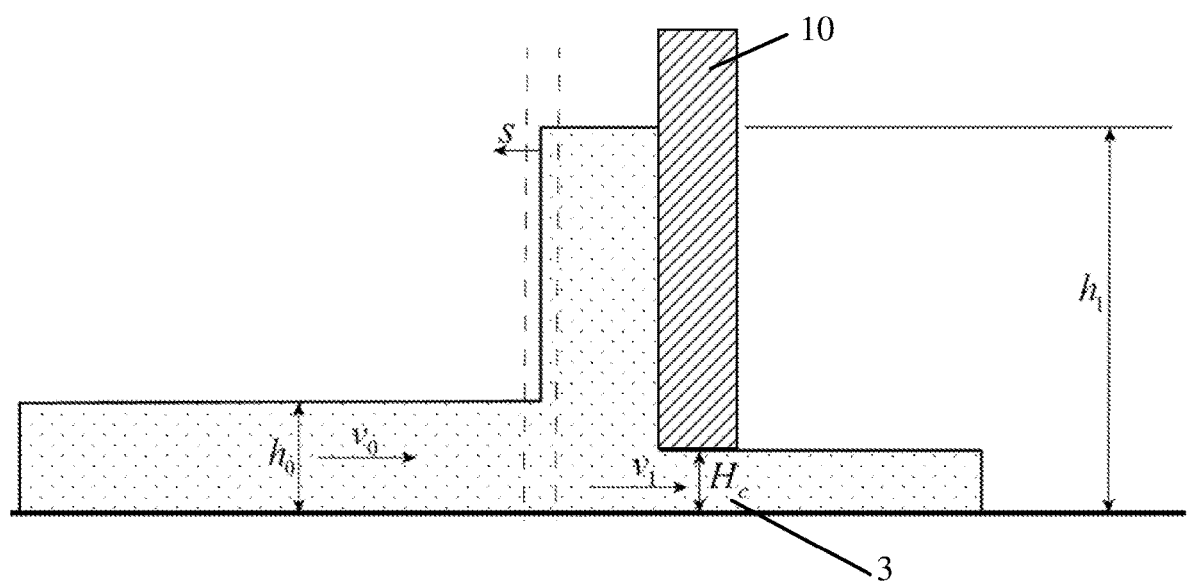
FIG. 6 is a schematic side view of a bottom hole type mudslide blocking dam provided by the embodiments of the present invention simulating mudslide impact.

Therefore, optionally, as shown in FIG. 6, the height of the dam body of the bottom hole type mudslide blocking dam is set to be greater than the climbing height $h_1$ of the mudslide on the basis of the known climbing height $h_1$ of the mudslide. In this way, when the bottom hole type mudslide blocking dam according to the embodiments of the present invention resists the mudslide disaster, the climbing height formed by the mudslide frontally impacting the bottom hole type mudslide blocking dam will not climb over the sediment storage dam from the top of the dam body 10. Certainly, those skilled in the art should also know that in order to effectively and rationally manufacture and use the bottom hole type mudslide blocking dam according to the embodiments of the present invention, the height of the dam body is usually designed and set according to the frequency of the mudslide disaster encountered in the area and the intensity of the mudslide disaster, and with reference to the intensity of once in 50 years, or the intensity and frequency of once in 100 years, etc. The height of the dam body of the bottom hole type mudslide blocking dam is set to be several meters higher than the simulated climbing height $h_1$ of the mudslide. Specific values of the higher part can be specifically set by those skilled in the art according to actual needs and experiences, and will not be specifically limited in the embodiments of the present invention.

Optionally, as shown in FIG. 4 and FIG. 5, the bottom hole type mudslide blocking dam according to the embodiments of the present invention includes a dam body 10 provided in connection with a channel at a target position of the channel, where a base clearance 3 is formed at the bottom of the dam body 10 by upward processing, and the base clearance 3 is used to allow part of the mudslide flowing through the section of the dam body in the channel to pass through.

By means of the arranged base clearance 3, the bottom hole type mudslide blocking dam according to the embodiments of the present invention, when subjected to the frontal impact of the mudslide, allows, at the bottom by means of the base clearance 3, part of the mudslide to flow out through the dam body 30 after being reduced a certain speed due to the resistance impact of the dam body 10. Since being slowed down due to the resistance impact, this part of mudslide will not carry a large amount of energy after flowing out through the dam body 10, which will not pose a threat again to the safety of people's lives and properties. Meanwhile, part of the mudslide passed through helps to alleviate the impact force on the bottom hole type mudslide blocking dam and the massive deposition for the mudslide, so that the bottom hole type mudslide blocking dam according to the embodiments of the present invention has a longer interception time and better interception capacity.

The base clearance 3 is formed at the bottom of the dam body 10 by upward processing. Usually, in order to allow part of the mudslide to pass through in a controllable state while reducing the flow velocity to ensure safety, the base clearance 3 is designed as a strip-shaped opening that is wider along the channel direction and narrower along the height direction when considering an easy calculation for the flow velocity and flow rate of the mudslide passed through. Commonly, the base clearance 3 is designed as a rectangle. The structure of the base clearance 3 with a rectangular section is convenient for processing, and for the calculation and measurement of the size of the base clearance 3.

Optionally, since the mountain structure prone to mudslide disasters in channels, rivers etc., is usually an inverted conical structure with a wide top and a narrow bottom, the dam body 10 of the bottom hole type mudslide blocking dam according to the embodiments of the present invention correspondingly includes a main dam 1 and abutments 2 connected to opposite sides of the main dam 1, the abutments 2 being connected to both side walls of the channel Thus, the bottom hole type mudslide blocking dam according to the embodiments of the present invention closely fitted with the inverted conical mountain structure. The section of the bottom hole type mudslide blocking dam according to the embodiments of the present invention is also in an inverted conical structure, where the central part running through the channel up and down is the main dam 1, and the parts connected to the opposite sides of the main dam 1 and connected to the side walls of the channel are abutments 2. As shown in FIG. 4 and FIG. 5, the height of the abutments 2 is generally set to be greater than or equal to the height of the main dam 1. This is because when the mudslide strikes, the abutments 2 are located closer to the side walls of the channel, and the impact force of the mudslide forms a combined force on the side walls of the channel and the abutments 2, making it easier to impact a larger climbing height $h_1$.

Optionally, as shown in FIG. 4 and FIG. 5, the base clearance 3 of the bottom hole type mudslide blocking dam according to the embodiments of the present invention is located at the bottom of the main dam 1.

As shown in FIG. 4, considering that the base clearance 3 is arranged at the bottom, for the mudslide carrying a large amount of energy, both the flow rate and flow velocity of the mudslide at the center of the channel are larger than those at the two sides, while the mudslide at the two sides will also form a thrust towards the center by being blocked by the side walls of the channel Therefore, the base clearance 3 is at least located at the bottom of the main dam 1 to ensure part of the mudslide to pass through. Certainly, along with the requirements for the shape design, flow design, etc. of the base clearance 3, the base clearance 3 can also be extended to the bottoms of the abutments 2 on both sides. This is not specifically limited in the embodiments of the present invention, and those skilled in the art are capable of designing and setting according to the design requirements and actual conditions of the base clearance 3.

As shown in FIG. 6, the bottom hole type mudslide blocking dam according to the embodiments of the present invention is built in the channel as a preventive fortification. By arranging a base clearance 3 at the bottom of the dam body 10, when the mudslide from the left side frontally impacts the dam body 10 of the bottom hole type mudslide blocking dam according to the embodiments of the present invention, the base clearance 3 arranged at the bottom of the dam body 10 can allow part of the mudslide to pass through under the condition that the dam body 10 blocks to weaken the large amount of impact force carried by the mudslide, and the other part of blocked mudslide will impact the dam body 10 on the left side and climb up along the dam body 10 until falling and depositing on the left side of the dam body 10 after the energy is released during the impact. The high point where the mudslide impacts upward along the surface of the dam body 10 is the climbing height $h_1$ of the mudslide. It can be seen from FIG. 6 that the climbing height $h_1$ of the mudslide is directly related to the flow rate and flow velocity when the mudslide passes through this position, and is also related to the position and size setting of the base clearance 3 at the bottom of the bottom hole type mudslide blocking dam. Therefore, in the embodiments of the present invention, the climbing height $h_1$ of the mudslide impacting the bottom hole type mudslide blocking dam is obtained by calculating the average flow depth $v_0$ and the average flow velocity $h_0$ of the mudslide at the target position, as well as the preset base clearance height $H_c$ of the bottom hole type mudslide blocking dam, and the height of the dam body of the bottom hole type mudslide blocking dam is determined to be a reasonable value according to the climbing height $h_1$ of the mudslide, so that, on the basis of ensuring the intercepting effectiveness for the mudslide, preventing the mudslide from impacting too much which results in climbing over the sediment storage dam, and improving the prevention and control effect of the mudslide disaster, the bottom hole type mudslide blocking dam according to the embodiments of the present invention can save the engineering materials for the building of the bottom hole type mudslide blocking dam, and reduce the engineering cost of the bottom hole type mudslide blocking dam.

The above descriptions are only preferred embodiments of the present invention, and are not intended to limit the present invention. For those skilled in the art, the present invention may have various modifications and changes. Any modifications, equivalent replacements, improvements, etc. made within the spirit and principles of the present invention shall be included within the scope of protection of the present invention.

What is claimed is:

1. A method for calculating a dam height of a bottom hole type mudslide blocking dam, comprising:

acquiring an average flow depth $v_0$ and an average flow velocity $h_0$ of the mudslide at a target position, wherein the target position is a position where a bottom hole type mudslide blocking dam is to be built;

calculating Fr according to $F_r = v_0/\sqrt{gh_0}$, wherein Fr is a dimensionless Froude number, g is the gravitational acceleration, and g=9.8 m/s$^2$;

calculating B according to $B = H_c/h_0$, wherein B is a relative clearance height, and $H_c$ is a base clearance height of the bottom hole type mudslide blocking dam; and establishing an equation $$\left(\frac{h_1}{h_0}\right)^3 - \left(\frac{h_1}{h_0}\right)^2 - (2F_r^2 + 1)\left(\frac{h_1}{h_0}\right) + 1 + 2F_r^2\left(2B^{2.5} - B^5 - B^4 + B^4\left(\frac{h_1}{h_0}\right)\right) = 0$$

and calculating $h_1$, $h_1$ being a climbing height of the mudslide, and determining the dam height of the bottom hole type mudslide blocking dam according to $h_1$.

2. The method for calculating a dam height of a bottom hole type mudslide blocking dam according to claim 1, wherein establishing an equation $$\left(\frac{h_1}{h_0}\right)^3 - \left(\frac{h_1}{h_0}\right)^2 - (2F_r^2 + 1)\left(\frac{h_1}{h_0}\right) + 1 + 2F_r^2\left(2B^{2.5} - B^5 - B^4 + B^4\left(\frac{h_1}{h_0}\right)\right) = 0$$

and calculating $h_1$ comprises:

establishing $\rho h_0(v_0+s)=\rho(h_1-H_c)s+\rho H_c(v_1+s)$ according to a mass conservation law, and solving s to obtain $$s = \frac{H_c v_1 - h_0 v_0}{h_0 - h_1},$$

wherein $\rho$ is the density of the mudslide, s is the shock wave velocity, and $v_1$ is the velocity of the mudslide flowing out of the base clearance of the bottom hole type mudslide blocking dam;

establishing an integral equation $$\rho h_0(v_0 + s)v_0 + \int_0^{h_0} \sigma_{0xx} dz = \rho H_c(v_1 + s)v_1 + \int_0^{h_1} \sigma_{1xx} dz$$

according to a momentum conservation law, wherein $\sigma_{0xx}$ and $\sigma_{1xx}$ are the pressure on the mudslide section, where $\sigma_{0xx}=\rho g(h_0-z)$, $\sigma_{1xx}=\rho g(h_1-z)$, and z is the ordinate of integration points; and substituting the equations of $\sigma_{0xx}$ and $\sigma_{1xx}$ into the integral equation to obtain $$h_0(v_0 + s)v_0 - H_c(v_1 + s)v_1 - \frac{1}{2}g(h_1^2 - h_0^2) = 0,$$

so as to solve $h_1$.

3. The method for calculating a dam height of a bottom hole type mudslide blocking dam according to claim 2, wherein substituting the equations of $\sigma_{0xx}$ and $\sigma_{1xx}$ into the integral equation to obtain $$h_0(v_0 + s)v_0 - H_c(v_1 + s)v_1 - \frac{1}{2}g(h_1^2 - h_0^2) = 0,$$

so as to solve $h_1$ comprises:

establishing a relational expression $v_1=v_0 B^{1.5}$ between $v_1$ and $v_0$;

substituting $$s = \frac{H_c v_1 - h_0 v_0}{h_0 - h_1}$$

and the relational expression $v_1=v_0 B^{1.5}$ into $$h_0(v_0 + s)v_0 - H_c(v_1 + s)v_1 - \frac{1}{2}g(h_1^2 - h_0^2) = 0$$

to obtain an equation $$\left(\frac{h_1}{h_0}\right)^3 - \left(\frac{h_1}{h_0}\right)^2 - (2F_r^2 + 1)\left(\frac{h_1}{h_0}\right) + 1 + 2F_r^2\left(2B^{2.5} - B^5 - B^4 + B^4\left(\frac{h_1}{h_0}\right)\right) = 0;$$

and solving $h_1$.

4. A bottom hole type mudslide blocking dam, wherein the bottom hole type mudslide blocking dam is calculated by the method for calculating a dam height of a bottom hole type mudslide blocking dam according to claim 3, and the dam body height of the bottom hole type mudslide blocking dam is set.

5. The bottom hole type mudslide blocking dam according to claim 4, comprising a dam body provided in connection with a channel at a target position of the channel, wherein a base clearance is formed at the bottom of the dam body by upward processing, and the base clearance is used to allow part of the mudslide flowing through the section of the dam body in the channel to pass through.

6. The bottom hole type mudslide blocking dam according to claim 5, wherein the dam body comprises a main dam and abutments connected to opposite sides of the main dam, the abutments being connected to both side walls of the channel.

7. The bottom hole type mudslide blocking dam according to claim 6, wherein the base clearance is located at the bottom of the main dam.

8. The bottom hole type mudslide blocking dam according to claim 7, wherein the height of the dam body is greater than the climbing height of the mudslide.

* * * * *